United States Patent
Xu (10) Patent No.: US 9,609,600 B2
(45) Date of Patent: Mar. 28, 2017

(54) WIRELESS COMMUNICATION SYSTEM WITH ENHANCED POWER MANAGEMENT

(71) Applicant: Micron Electronics LLC, Delray Beach, FL (US)

(72) Inventor: Jun Xu, Delray Beach, FL (US)

(73) Assignee: MICRON ELECTRONICS LLC, Delray Beach, FL (US)

( * ) Notice: Subject to any disclaimer, the term of this patent is extended or adjusted under 35 U.S.C. 154(b) by 130 days.

(21) Appl. No.: 13/924,532

(22) Filed: Jun. 21, 2013

(65) Prior Publication Data

US 2014/0378081 A1    Dec. 25, 2014

(51) Int. Cl.
*H04M 11/04* (2006.01)
*H04W 52/02* (2009.01)
*H04W 4/22* (2009.01)

(52) U.S. Cl.
CPC ......... *H04W 52/0251* (2013.01); *H04W 4/22* (2013.01)

(58) Field of Classification Search
CPC . H04W 4/22; H04W 76/007; H04W 28/0221; H04W 40/10; H04W 52/00; H04W 52/02; H04W 52/0235; H04W 52/0277; H04W 52/028; H04W 52/0283; H04W 52/0251
USPC ....... 455/404.1, 522, 572–574, 127.1, 127.5, 455/343.1–343.6, 521, 404, 401.1
See application file for complete search history.

(56) References Cited

U.S. PATENT DOCUMENTS

| | | | |
|---|---|---|---|
| 2002/0001367 A1* | 1/2002 | Lee | G08B 25/08 379/41 |
| 2004/0235424 A1* | 11/2004 | Kim | 455/68 |
| 2004/0235448 A1* | 11/2004 | Chang | 455/404.1 |
| 2005/0075116 A1* | 4/2005 | Laird et al. | 455/456.3 |
| 2007/0254680 A1* | 11/2007 | Nassimi | H04M 1/72511 455/462 |
| 2010/0003950 A1* | 1/2010 | Ray et al. | 455/404.1 |
| 2010/0106886 A1* | 4/2010 | Marcu et al. | 711/102 |
| 2012/0214418 A1* | 8/2012 | Lee et al. | 455/41.2 |
| 2013/0109342 A1* | 5/2013 | Welch | 455/404.2 |
| 2013/0246071 A1* | 9/2013 | Lee | H04W 52/0254 704/275 |

* cited by examiner

*Primary Examiner* — Amancio Gonzalez
(74) *Attorney, Agent, or Firm* — Anova Law Group, PLLC (57) ABSTRACT

A method is provided for a wireless communication device containing at least a main processor for data processing, and a transmitter and a receiver for wireless communication. The method includes providing power to the main processor using a power source via a power switch, performing device initialization of the wireless communication device, and determining whether the wireless communication device recovers from a power-down standby mode, where the power source is disconnected to the main processor such that the main processor does not consume power from the power source. Further, the method includes recovering device states based on information stored on a non-volatile storage when it is determined that the wireless communication device recovers from a power-down standby mode. The method also includes reporting device status including at least battery level of the wireless communication device to an external server based on configuration information on the wireless communication device.

20 Claims, 4 Drawing Sheets

WIRELESS COMMUNICATION SYSTEM WITH ENHANCED POWER MANAGEMENT

FIELD OF THE INVENTION

The present invention generally relates to wireless communication technologies and, more particularly, to the methods and systems for enhancing power management of wireless communication services.

BACKGROUND

In a modern society, wireless communication has already become a part of people's lives. People are expecting a ubiquitous availability of wireless communication in our environment, including places that are isolated, such as parking lots, parks and trails, campus, common areas, transit areas, etc., where emergency wireless communication equipment may need to be provided to keep the places and people visiting such places safe. Emergency wireless communication equipment is also used by every emergency personnel, such as fire fighters, search and rescuers, and other emergency responders.

Requirements for emergency wireless communication equipment may be different from ordinary wireless communication devices due to different usage patterns and conditions. Although emergency wireless communication equipment is expected to be used in harsh conditions with high reliability, similar to ordinary wireless phones, emergency wireless communication equipment may often be powered by batteries, and the battery standby life is critical for the emergency wireless communication equipment. Because the emergency wireless communication equipment is often used infrequently, a short standby battery life means more frequent maintenance and more likely being in a low battery condition when the emergency wireless communication equipment is actually used. Other wireless applications may often face similar problems.

Existing mobile power management technologies use various methods to try to limit device standby power consumption by introducing certain idle mode where the mobile device is not actively used, which often relies on hardware inactivity timers or motion sensor to determine whether a device was idle. In the idle mode, processors and communication devices in the mobile device are in a sleep state to keep the power consumption lower, but still processing certain incoming data. However, it often takes several minutes before the device could identify idle behavior and switch to a lower power consumption state, and the lower power consumption level is still not desired because the mobile device (e.g., processors and communication devices, etc.) still draws power even in the idle mode.

The disclosed methods and systems are directed to solve one or more problems set forth above and other problems.

BRIEF SUMMARY OF THE DISCLOSURE

One aspect of the present disclosure includes a method for a wireless communication device. The wireless communication device contains at least a main processor for data processing, and a transmitter and a receiver for wireless communication. The method includes providing power to the main processor using a power source via a power switch, performing device initialization of the wireless communication device, and determining whether the wireless communication device recovers from a power-down standby mode. In the power-down standby mode, the power source is disconnected to the main processor such that the main processor does not consume power from the power source. Further, the method includes recovering device states based on information stored on a non-volatile storage when it is determined that the wireless communication device recovers from a power-down standby mode. The method also includes reporting device status including at least battery level of the wireless communication device to an external server based on configuration information on the wireless communication device.

Another aspect of the present disclosure includes a wireless communication device. The wireless communication device includes at least a main processor for data processing, a memory coupled to the main processor for storing data, a transmitter and a receiver for wireless communication through an antenna, and a power source for providing power to the main processor via a power switch. The main processor is configured to perform device initialization of the wireless communication device, and to determine whether the wireless communication device recovers from a power-down standby mode. In the power-down standby mode, the power source is disconnected to the main processor such that the main processor does not consume power from the power source. Further, main processor is configured to, when it is determined that the wireless communication device recovers from a power-down standby mode, recover device states based on information stored on a non-volatile storage. The main processor is also configured to report device status including at least battery level of the wireless communication device to an external server based on configuration information on the wireless communication device.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
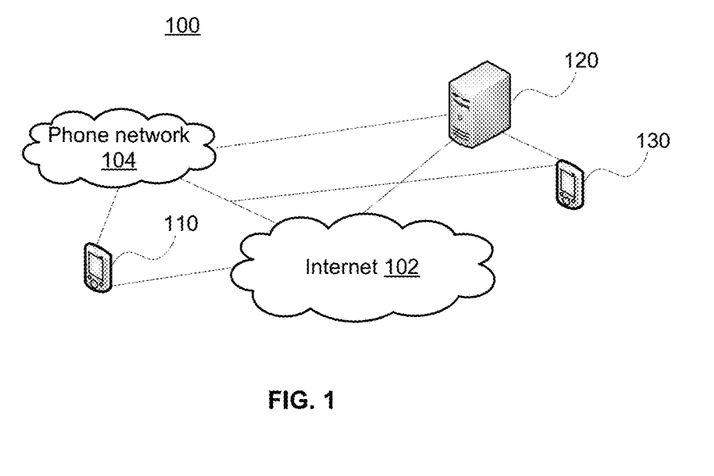
FIG. 1 illustrates an exemplary network environment incorporating certain aspects of the disclosed embodiments.

FIG. 1 illustrates an exemplary communication environment incorporating certain aspects of the disclosed embodiments. As shown in FIG. 1, communication environment 100 may include the Internet 102, a phone network 104, a wireless device 110, a communication server 120, and a communication device 130. Other components may be added and certain components may be removed without departing from the principles of the disclosed embodiments.

The Internet 102 may include any private and public computer networks interconnected using the standard transport control protocol/internet protocol (TCP/IP). Internet 102 may carry a large number of services over IP, such as the inter-linked hypertext documents of the World Wide Web (WWW) and electronic mail (or email). Internet 102 may connect a large number of websites. Further, Internet 102 may also carry voice-over IP (VOIP) services to enable voice or the like communications over Internet 102.

Phone network 104 may include any appropriate phone network such as a VOIP network, a public switched telephone network (PSTN), a cellular network, or any other telephone networks.

The wireless device 110 may include any appropriate communication device wirelessly communicate with the communication server 120. For example, the wireless device 110 may include a phone, a smart phone, a computer, a cell/mobile phone, a PDA, a tablet, or any customized communication devices used under various emergency conditions, etc. Although one wireless device 110 is shown in FIG. 1, any number and types of wireless devices may be included.

The communication server 120 may include one or more appropriate computer servers configured to provide various services to users through Internet 102 and/or phone network 104. For example, communication server 120 may provide monitoring services (e.g., emergency monitoring, security monitoring, other types of monitoring, etc.), emergency response services, and/or emergency information access services, etc. Although one communication server 120 is included, any number of communication servers may be included.

The communication device 130 may include any appropriate device for communicating with the wireless device 110 directly through wireless channels or through wired communication path. The communication device 130 may also communicate with the communication server 120. Under certain circumstances, the communication device 130 and the communication server 120 may be used interchangeably.

The wireless device 110 may communicate with the communication server 120 wirelessly over the various networks. For example, wireless device 110 may use any available cellular wireless standards, such as, GSM, GPRS, CDMA, WCDMA, 3G, 4G, and LTE, etc., 2-way radio, point-to-point, satellite, WIFI, and any other appropriate wireless communication protocols to communicate with the communication server 120.

Further, the wireless device 110 may communicate with the communication server 120 through a wireless service operator or without a wireless service operator. For example, the wireless device 110 may communicate with the communication server 120 using a wireless operator's short message service (SMS) to exchange information with the communication server 120 using SMS messages.

In operation, the communication server 120 may maintain a database to store various information about associated wireless devices. The wireless device 110 may periodically report its status to the communication server 120 according to preconfigured criteria, such as battery status of the wireless device 110. Further, the communication server 120 may configure the wireless device 110 remotely.

For example, the communication server 120 may set a status reporting period, or may set an emergency handling entity (e.g., phone number, IP address, SIP number, etc.) or an intended reporting entity for the wireless device 110 to communicate with. When an emergency event or other intended condition happens, the wireless device 110 may communicate with the emergency handling entity or the intended reporting entity automatically. The emergency handling entity may include the communication server or a different entity, e.g., a 911 call center, etc. The intended reporting entity may include any appropriate devices or systems, such as a monitoring center, or a single user device (e.g., the communication device 130).

The communication environment 100 may be applied at various wireless communication systems and applications. For example, the communication environment 100 may include emergency wireless communication, asset tracking and monitoring, logistic, fleet management, and remote control, etc.

Figure 2:
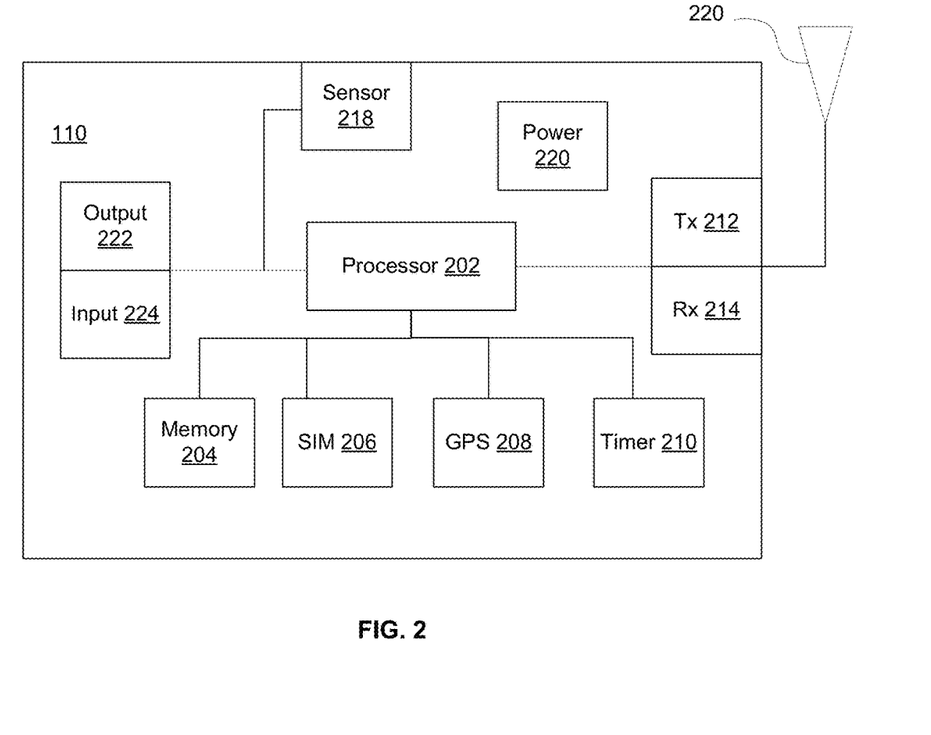
FIG. 2 illustrates a block diagram of an exemplary wireless device consistent with the disclosed embodiments.

FIG. 2 illustrates a block diagram of an exemplary wireless device 110 consistent with the disclosed embodiments. As shown in FIG. 2, wireless device 110 may include a processor 202, a memory 204, a subscriber identification module (SIM) 206, a global positioning system (GPS) unit 208, a timer 210, a transmitter 212, a receiver 214, an antenna 220, a sensor 218, a power source 220, an output 222, and an input 224. Certain components may be omitted, and other components may be added.

Processor 202 may include any appropriate type of graphic processing unit (GPU), general-purpose microprocessor, digital signal processor (DSP) or microcontroller, and application specific integrated circuit (ASIC), etc. Processor 202 may also include a communication processor, such as a base-band processor for wireless communication, etc.

Processor 202 may execute sequences of computer program instructions to perform various processes associated with wireless device 110. The computer program instructions may be stored and/or loaded in memory 204 for execution by processor 202.

Memory 204 may include any appropriate memory units, such as random access memory (RAM), read-only memory (ROM), flash memory, or any other type of memory or storage. Memory 204 may include a non-volatile memory (e.g., flash memory) for storing data as well as program execution states to preserve such information when power is not available. The non-volatile and other volatile memory may also be used for executing computer programs and storing run-time data, etc.

SIM card 206 may include any appropriate subscriber identification card to authenticate the wireless device 110 and for accessing the wireless networks corresponding to the SIM card 206. Although SIM card is used in FIG. 2, any type of identification device may be used.

GPS 208 may include any appropriate GPS device for providing location information about the wireless device 110. Timer 210 may provide various timer functions and associated logics for the wireless device 110.

Further, through the antenna 220, the transmitter 212 and receiver 214 may provide wireless data communication transmission and receiving functions according to various wireless communication protocols. The sensor 218 may include any appropriate type of sensor for sensing one or more parameters such that the sensing signals may be provided to the processor 202 for further processing to determine the sensing parameters, or the sensing signals may be used directly to control certain logics of the wireless device 110.

The power source 220 may include any appropriate power source to provide electrical power to the processor 202 and other components the wireless device 110. For example, the power source 220 may include AC power, DC power, solar power, and/or other power. In certain embodiments, the power source 220 may be one or more battery, and the battery may be recharged using various types of power sources. Further, the battery 220 may also include certain control logics for sending battery status to processor 202 and/or to controlling/distributing battery output to the various components. A power-on switch (not shown) may be used to control the power to various components of the wireless device 110, such as processor 202, SIM 206, transmitter 212, and receiver 214, etc.

The output 222 may be provided for a user of the wireless device 110 to receive information from wireless device 110. For example, output 222 may include any appropriate output device, such as a display, a speaker, or any other output devices.

The input 224 may be provided for the user to input information into the wireless device 110. For example, input 224 may include any appropriate input device, such as a keyboard, a microphone, a touch screen, or any other input devices. In certain embodiments, the input 224 may be a single button, which can be pressed by the user such that a communication can be sent to a pre-configured emergency handling entity or a pre-configured intended reporting entity.

Figure 3:
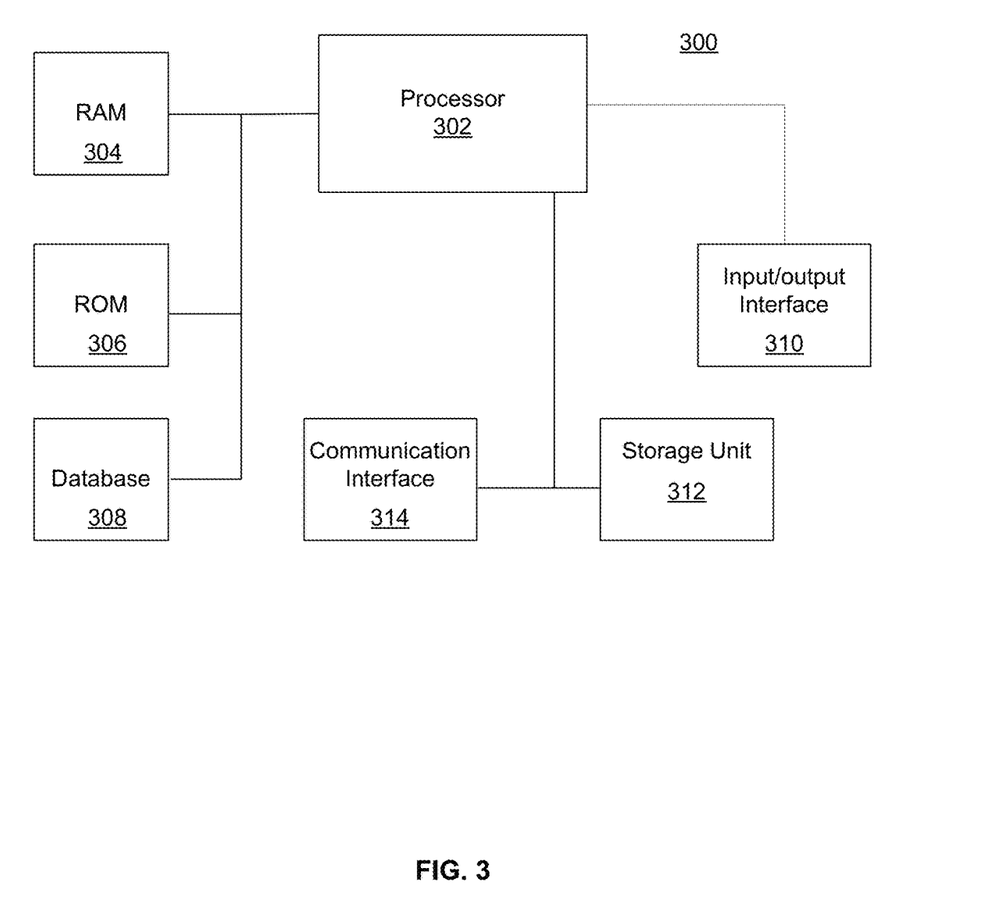
FIG. 3 illustrates a block diagram of an exemplary communication server consistent with the disclosed embodiments.

On the other hand, the communication server 120 may be implemented by any appropriate computer system. FIG. 3 shows a block diagram of an exemplary computing system 300 used to implement communication server 120.

As shown in FIG. 3, computing system 300 may include a processor 302, a random access memory (RAM) unit 304, a read-only memory (ROM) unit 306, a database 308, an input/output interface unit 310, a storage unit 312, and a communication interface 314. Other components may be added and certain devices may be removed without departing from the principles of the disclosed embodiments.

Processor 302 may include any appropriate type of graphic processing unit (GPU), general-purpose microprocessor, digital signal processor (DSP) or microcontroller, and application specific integrated circuit (ASIC), etc. Processor 302 may execute sequences of computer program instructions to perform various processes associated with computing system 300. The computer program instructions may be loaded into RAM 304 for execution by processor 302 from read-only memory 306.

Database 308 may include any appropriate commercial or customized database to be used by computing system 300, and may also include query tools and other management software for managing database 308. Further, input/output interface 310 may be provided for a user or users to input information into computing system 300 or for the user or users to receive information from computing system 300. For example, input/output interface 310 may include any appropriate input device, such as a remote control, a keyboard, a mouse, a microphone, a video camera or web-cam, an electronic tablet, voice communication devices, or any other optical or wireless input devices. Input/output interface 310 may include any appropriate output device, such as a display, a speaker, or any other output devices.

Storage unit 312 may include any appropriate storage device to store information used by computing system 300, such as a hard disk, a flash disk, an optical disk, a CR-ROM drive, a DVD or other type of mass storage media, or a network storage. Further, communication interface 314 may provide communication connections such that computing system 300 may be accessed remotely and/or communicate with other systems through computer networks or other communication networks via various communication protocols, such as TCP/IP, hyper text transfer protocol (HTTP), etc.

Returning to FIG. 1, during operation, the wireless device 110 and the communication server 120 may perform certain operations to provide communication services with an enhanced power management capability. That is, as disclosed, wireless device 110 and/or the communication server 120 may be configured to implement a special power management mechanism to substantially prolong the battery standby time of the wireless device 110.

For example, in certain embodiments, the wireless device 110 may be configured to support a power-down standby (PDS) mode as part of the power management for the wireless device 110. In the PDS mode, processing elements of the wireless device 110 are powered down instead of being idle at a low power consumption level. That is, in the PDS mode, processor 202, transmitter 212, receiver 214, antenna 220, memory 204, SIM 206, GPS 208, etc., and other processing components are turned off (i.e., the entire wireless device 110 is turned off or substantially turned off without any idle power saving mode), and only a predetermined number of accessorial devices may be provided with power for controlling the power-on switch (not shown) of the power 220. The power-on switch may be configured to connect with the main processing circuitry such that the power-on switch can be turned off to stop the power to the main processing circuitry or can be turned on to provide power to the turned-off processing components from power 220 under the control of one or more of the accessorial devices.

The accessorial devices may include any appropriate types of devices capable of generating a triggering signal for the power-on switch to connect power 220 to various processing components of the wireless device 110.

For example, the accessorial devices may include a timer (e.g., timer 210). The timer may be an internal timer from a processing chip (e.g., processor 202) or a discrete timer chip or device configured to generate a time-out signal when a pre-set timer value is reached. The timer may periodically generate the time-out signal based on the timer value.

The time-out value (i.e., the initial value of the timer) may be configured by a particular software interface by the user. Alternatively, the timer value may be set up on the circuit board using a specific tool, such as by a jumper, a register, or other configuration means. A default value may be set for the timer value and changes may be made by the user through software, hardware, or both. In certain embodiments, the timer value may be set to tens of seconds, a few minutes, a few hours, or tens of hours.

Further, the time-out signal may be provided to the power-on switch to connect power 220 to various processing components of the wireless device 110, such that the wireless device 110 can be powered on by power 220 when the timer times-out. The timer value may also be configured by the operator of the communication server 120 or by a user of communication device 130 remotely.

The accessorial devices may include a sensor or sensors which sense conditions and parameters of the surroundings of the wireless device 110, such as a temperature sensor, a motion sensor, a tilt sensor, a humidity sensor, a light sensor, a pressure sensor, a gravity sensor, a magnetic sensor, a moisture sensor, an electrical field sensor, an impact sensor, a sound sensor, and different types of dio sensors, etc. The sensing signal may be provided to the power-on switch to connect power 220 to power on the wireless device 110.

The accessorial devices may also include an input device (e.g., input 224) for direct human interference, such as a physical push button or a human-voice activated switch. The output signal of the input device may then be provided to power-on switch to power on the wireless device 110.

More particularly, the direct human interference may also be used for the user of the wireless device 110 to send out emergency messages or any other type messages to a preconfigured emergency handling entity or any intended reporting entity. For example, the user may press a single button, which generates an output signal to turn on the power-on switch, which then turns on the power source on the wireless device 110 and, at the same time, the output signal may also indicate that an emergency message (such as a 911 call or an emergency SMS message) or an intended message needs to be sent out automatically without further user intervention after the wireless device 110 is powered on.

That is, by a single pressing on the input device (e.g., a physical button), the wireless device 110 is brought back from the power-down standby mode and a message is automatically sent out after the power source is connected to the entire wireless device 110. Other accessorial devices may also be used to implement such one-trigger mechanism.

Optionally or additionally, the wireless device 110 may be controlled by another device (not shown) over a machine-to-machine (M2M) communication interface. The accessorial devices may include an M2M communication device such that a control signal or message from an external device based on wired or wireless communication channels via WIFI, Zigbee, RFID, Bluetooth, Mbus, etc., can be used to control the power-on switch and/or indicate an emergency event or a reporting event for sending an emergency message or a reporting message to the preconfigured emergency handling entity or intended reporting entity. Because such short-range wireless device consumes little power, the battery standby time can be improved.

Figure 4:
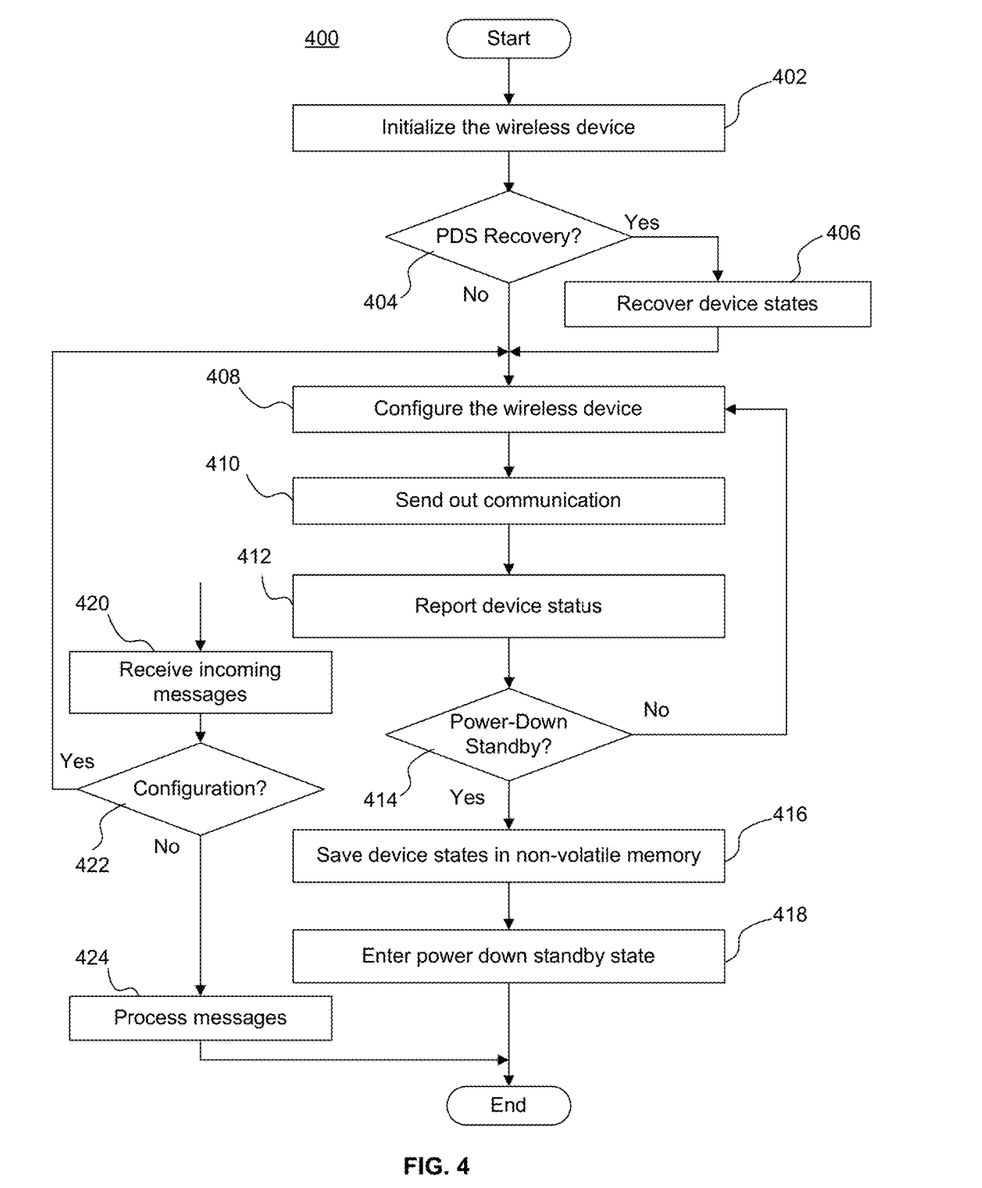
FIG. 4 illustrates an exemplary wireless device operational process consistent with the disclosed embodiments.

FIG. 4 illustrates an exemplary operational process 400 performed by the wireless device 110 (e.g., processor 202 of the wireless device 110) consistent with the disclosed embodiments.

As shown in FIG. 4, when the wireless device 110 is power-on, various components of the wireless device 110 are initialized (402). For example, the wireless device 110 may run self-test or other processes to initialize the hardware components and software components. Further, because the wireless device 110 may be powered back or recovering from a power-down standby (PDS) mode, the wireless device 110 may determine whether the wireless device 110 is in a PDS recovery mode (404).

The wireless device 110 may check certain indicator, such as a register, a memory location, or any other device that stores the PDS state. If the wireless device 110 determines that it is recovering from a PDS mode (404; Yes), the wireless device 110 may recover all the device states of the wireless device 110 (406).

That is, before the wireless device 110 enters the power-down standby mode, the wireless device 110 may save all device states in a non-volatile memory. During a PDS mode recovery, the wireless device 110 may obtain all the device states from the non-volatile memory.

If the wireless device 110 determines that it is not recovering from a PDS mode (404; No), or after the wireless device 110 recovers all the device states, the wireless device 110 may configure the device such that the wireless device 110 may be ready for operation (408).

Further, if the PDS recovery is caused by a user input for sending out a communication after recovery (e.g., by pressing a single emergency button on the wireless device 110), the wireless device 110 may send out an emergency communication or an intended message to the preconfigured emergency handling entity or intended reporting entity (408). For example, the wireless device 110 may call a 911 call center number, may call a phone number configured to receive the communication, or may send an SMS message to the communication server 120, etc.

In addition, the wireless device 110 may report device status to the communication server 120 (412). For example, the wireless device 110 may detect status and/or statistics of certain components of the wireless device 110, such battery status, communication device status, etc.

In certain embodiments, the wireless device 110 may report battery level periodically to the communication server 120 such that the communication server 120 can know that the wireless device 110 is active and when to recharge the battery of the wireless device 110. That is, after switching back to normal power mode, the wireless device 110 may detect the battery level at a user defined time period. For instance, the wireless device 110 may recover from the PDS mode every 24 hours to detect the battery level and send or update to the communication server 120.

During an emergency operation, the user of the wireless device 110 may start emergency communication by input a simple indication for an emergency event such that an emergency communication can be automatically initiated. For example, the user may press the push button to send out an emergency communication automatically without any further input. The emergency communication is sent out to the preconfigured emergency handling entity after the emergency wireless device receives the input signal indicating such emergency event. That is, the user may press the push button to send out emergency communication when the wireless device 110 is in operation, or may press the push button to recover from the PDS and send out the emergency communication automatically at the same time without further input when the wireless device 110 is in PDS standby.

During other operations, the user may also send a message to a preconfigured intended reporting entity by pressing the push button or by pressing a soft button. The intended reporting entity may include a phone number, an IP address, or any other address to receive the message.

Further, during operation, the wireless device 110 may determine whether to enter the power-down standby (PDS) mode (414). The wireless device 110 (e.g., software programs running on the wireless device 110) may detect whether the device is idle, e.g., whether any application is running.

If the wireless device 110 determines that PDS mode should not be entered (414; No), the wireless device 110 may continue normal operation, such as configuring the device if needed, sending/receiving communication if needed, and reporting device status periodically, etc.

On the other hand, if the wireless device 110 determines that the PDS mode should be entered (414; Yes), the wireless device 110 may save device states into the non-volatile memory (416). After the device states are stored, the wireless device 110 may enter the PDS mode. For example, the wireless device 110 may shut down the processing elements and disconnect the power-on switch such that power 220 is not providing power to the sub-systems and other processing units of the wireless device 110.

Additionally, during operation, the wireless device 110 may receive incoming communication (420). For example, the wireless device 110 may receive an incoming call or message from an external phone or may receive an SMS message from the communication server 120 or form an external device via an M2M communication device or interface.

After receiving the message, the wireless device 110 may determine a type of the message and further determine whether it is a configuration message (422). That is, the wireless device 110 determines whether the message is sent by the communication server 120 to configure certain parameters on the wireless device 110.

For example, the configuration message may change the period in which the wireless device 110 reports device status to the communication server 120, set a wake-up timer value, or change the emergency handling entity to which the wireless device 110 may send its emergency communication or intended reporting entity to which the wireless device 110 may send other communication, such as tracking message, event message, location message, status message, control message, etc.

If the wireless device 110 determines that the message is a configuration message (422; Yes), the wireless device 110 may perform the configuration based on the configuration message (408). For instance, the wireless device 110 may configure the timer value for waking up from the PDS mode, the time period for reporting device status, etc.

If the wireless device 110 determines that the message is not a configuration message (422; No), the wireless device 110 may further processing the incoming message (424). For example, the wireless device 110 may establish a communication with the calling party or the SMS sender. Other processing may also be performed. For example, the incoming message may be a command to be executed by the wireless device 110, the wireless device 110 may execute the command accordingly and may further send back response to the sender (e.g., the communication server 120).

Figure 5:
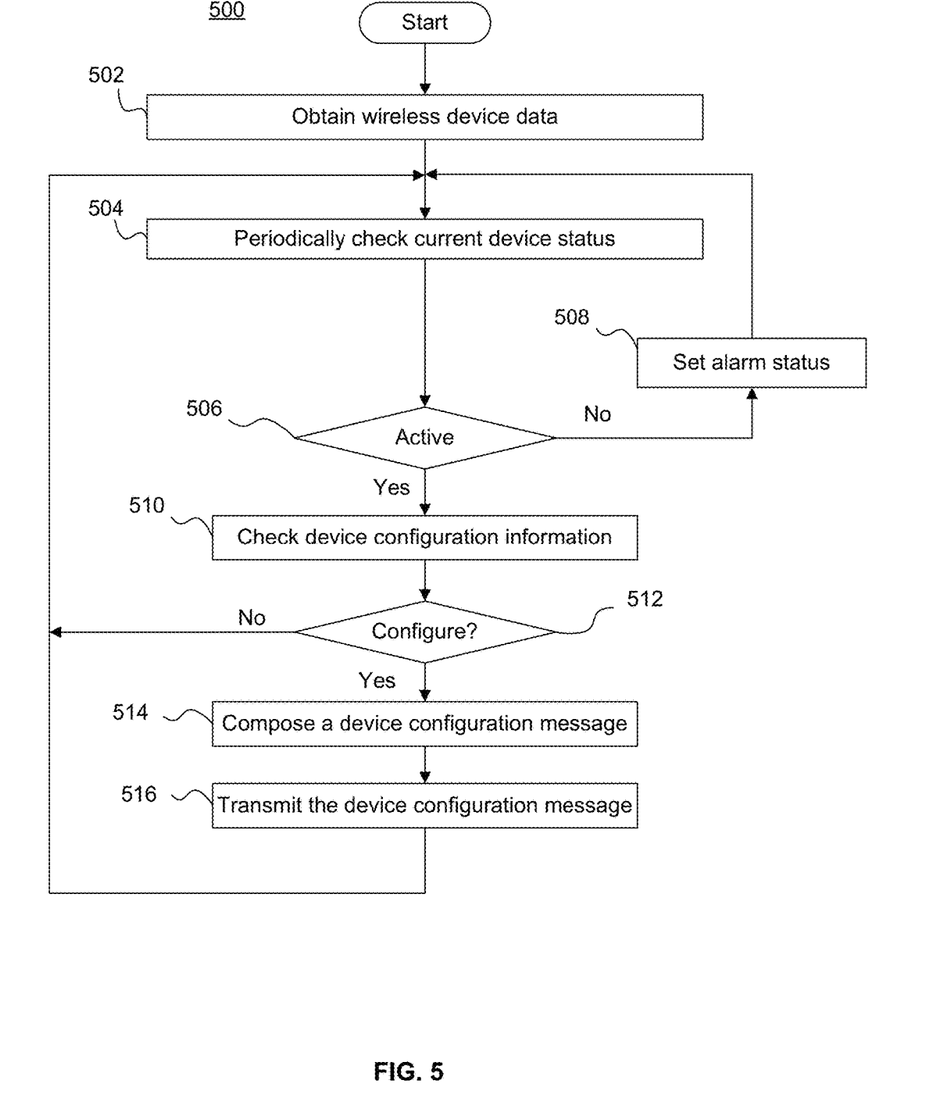
FIG. 5 illustrates an exemplary communication server operational process consistent with the disclosed embodiments.

FIG. 5 illustrates an operation process 500 performed by the communication server 120 to facilitate the PDS-based power management mechanism.

As shown in FIG. 5, the communication server 120 may obtain information of all wireless devices under its control (502). The communication server 120 may maintain a database of device data about the wireless devices that are managed by the communication server 120.

The communication server 120 may also periodically check current device status (504). For example, the communication server 120 may check whether any status report is received from a particular wireless device within a predetermined time period. This time period may correspond to the time period for the wireless device to report device status, such that the wireless device is able to report device status (under normal operational condition) to the communication server 120 within the predetermined time period.

Further, based the device status, the communication server 120 may determine whether a wireless device is active (506). The communication server 120 may determine whether a wireless device is active based on the device status. If the communication server 120 determines that the wireless device is not active (506; No), the communication server 120 may set an alarm status for the wireless device (508). For example, an alarm message may be sent to an operator or the user of the wireless device to notify the alarm status. More specifically, if the battery level is below a threshold, a message may be sent to the user of the wireless device to recharge the battery.

On the other hand, if the communication server 120 determines that the wireless device is active (506; Yes), the communication server 120 may check the device configuration information (510) and may determine whether the wireless device needs to be configured (512). The communication server 120 may configure the wireless device with a different emergency handling entity, a different intended reporting entity, a different reporting time period, a different battery level for recharging, etc.

If the wireless device does not need to be configured (512; No), the communication server 120 may continue the operation process. If the communication server 120 determines that the wireless device needs to be configured (512; Yes), the communication server 120 may compose a device configuration message (514) and may also transmit the device configuration message to the corresponding wireless device (516). The operation process may continue to provide the monitoring and configuring functions to facilitate the enhanced power management mechanism on the wireless devices.

The disclosed systems and methods may be used in various wireless communication applications, including emergency wireless devices applications, asset tracking and monitoring applications, logistic application, fleet management applications, remote control applications, etc. Any wireless communication equipment may benefit from the enhanced power-down standby mode and related communication methods.

By using the disclosed systems and methods, the wireless device is not put into some kind of low power consumption state. Rather, the wireless device is completely powered off and the battery supply is disconnected. Then the device is powered-on, through certain "wake-up" mechanisms, to perform certain activities and, upon completion, returns to the power-down standby state. Thus, when the device is not performing any activity, a significantly-less amount or no battery power is used, and the battery connects only when the device is "woke up." The device can remain in standby state for weeks or months without recharging the battery, whereas the best traditional low power consumption mode can last only a few days or a couple of weeks.

Other applications, advantages, alternations, modifications, or equivalents to the disclosed embodiments are obvious to those skilled in the art.

What is claimed is:

1. A method for a wireless communication device containing a processing portion and an accessorial device separate from the processing portion, the accessorial device having a wired connection with the processing portion, comprising:

providing power to the processing portion using a power source via a power-on switch and to the accessorial device without the power-on switch;

performing device initialization of the wireless communication device;

determining whether the wireless communication device recovers from a power-down standby mode, in which the power source is disconnected to the processing portion such that the processing portion does not consume power from the power source, wherein the processing portion includes at least a main processor for data processing, a memory coupled to the main processor for storing data, and a transmitter and a receiver for wireless communication through an antenna;

in response to determining that the wireless communication device recovers from a power-down standby mode, recovering device states based on device states information stored in a non-volatile storage, and reporting device status including at least battery level of the wireless communication device to an external intended reporting entity based on configuration information of the wireless communication device;

receiving an incoming communication message from the external intended reporting entity;

determining whether the incoming communication message is a configuration updating message based on the reported device status;

in response to determining the incoming communication message is a configuration updating message, configuring the device states based on the configuration updating message and updating the device states information stored in the non-volatile storage;

receiving a user input to indicate an emergency event when the wireless communication device is at the power-down standby mode;

in response to receiving the user input, turning on the power-on switch to connect the power source to the processing portion to recover the wireless communication device from the power-down standby mode, and using the wireless communication device to automatically send an emergency communication to a preconfigured emergency handling entity without further user input; and wherein, when the wireless communication device is recovered from the power-down standby mode, the power-on switch is turned on by a triggering signal created by the accessorial device without input from a host for the wireless communication device.

2. The method according to claim 1, further including:
determining the wireless communication device is idle;
storing device states information in the non-volatile memory; and
disconnecting the power source to a substantial part of the wireless communication device including the main processor.

3. The method according to claim 1, wherein:
the accessorial device is a timer, a time-out value of which is configured remotely; and
the timer generates a time-out signal as the triggering signal based on the time-out value when the timer times-out.

4. The method according to claim 3, wherein:
the configuration updating message includes at least an update time-out value of the timer.

5. The method according to claim 1, wherein:
the accessorial device is a push button, a press on which generates an input signal as the triggering signal.

6. The method according to claim 5, wherein:
the press on the button simultaneously indicates to the wireless communication device to send out an emergency communication automatically without further user input after the power is provided to the wireless communication device.

7. The method according to claim 1, wherein:
the accessorial device is a sensor, and a sensing signal is used as the triggering signal.

8. The method according to claim 1, further including:
receiving an incoming message;
determining whether the incoming message is a configuration message;
when the incoming message is a configuration message, configuring the wireless communication device according to the incoming message.

9. The method according to claim 1, wherein:
when the wireless communication device is at the power-down standby mode, only the accessorial device is provided with power for controlling the power-on switch;
the accessorial device implements a one-trigger mechanism, such that by a single triggering signal from the accessorial device, the wireless communication device is brought back from the power-down standby mode without further input; and
the accessorial device is only used for controlling the power-on switch to recover the wireless communication device from the power-down standby mode.

10. The method according to claim 1, wherein:
the configuration updating message includes information of an update emergency handling entity to which the wireless communication device is going to send the emergency communication.

11. The method according to claim 1, wherein:
the configuration updating message includes information of an update intended reporting entity to which the wireless communication device is going to report the device status.

12. The method according to claim 1, wherein:
the device status further includes tracking message of the wireless communication device, event message of the wireless communication device, location message of the wireless communication device, status message of the wireless communication device, and control message of the wireless communication device.

13. A wireless communication device, comprising:
a processing portion having at least a main processor for data processing, a memory coupled to the main processor for storing data, a transmitter and a receiver for wireless communication through an antenna;
an accessorial device separate from the processing portion, the accessorial device having a wired connection with the processing portion;
a power source for providing power to the main processor via a power-on switch and to the accessorial device without the power-on switch; and
an input device configured to:
receive a user input to indicate an emergency event when the wireless communication device is at the power-down standby mode,
in response to receiving the user input, turn on the power-on switch to connect the power source to the processing portion of the wireless communication device, and signal the main processor to send an emergency communication automatically to a preconfigured emergency handling entity without further user input;
wherein the main processor is further configured to:
perform device initialization of the wireless communication device;
determine whether the wireless communication device recovers from a power-down standby mode, in which the power source is disconnected to the processing portion such that the processing portion does not consume power from the power source;
in response to determining that the wireless communication device recovers from a power-down standby mode, recover device states based on device states information stored in a non-volatile storage, and report device status including at least battery level of the wireless communication device to an external intended reporting entity based on configuration information of the wireless communication device;

receive an incoming communication message from the external intended reporting entity;

determine whether the incoming communication message is a configuration updating message based on the reported device status;

in response to determining the incoming communication message is a configuration updating message, configuring the device states based on the configuration updating message and updating the device states information stored in the non-volatile storage;

wherein, when the wireless communication device is recovered from the power-down standby mode, the power-on switch is turned on by a triggering signal created by the accessorial device without input from a host for the wireless communication device.

14. The wireless communication device according to claim 13, wherein the main processor is further configured to:

determine the wireless communication device is idle;

store device states information in the non-volatile memory; and disconnect the power source to a substantial part of the wireless communication device including the main processor.

15. The wireless communication device according to claim 13, wherein:

the accessorial device is a timer, a time-out value of which is configured remotely; and the timer generates a time-out signal as the triggering signal based on the time-out value when the timer times-out.

16. The wireless communication device according to claim 13, wherein:

the accessorial device is a push button, a press on which generates an input signal as the triggering signal.

17. The wireless communication device according to claim 16, wherein:

the press on the button simultaneously indicates to the wireless communication device to send out an emergency communication automatically without further user input after the power is provided to the wireless communication device.

18. The wireless communication device according to claim 13, wherein:

the accessorial device is a sensor, a sensing signal is used as the triggering signal.

19. The wireless communication device according to claim 13, wherein the main processor is further configured to:

receive an incoming message;

determine whether the incoming message is a configuration message;

when the incoming message is a configuration message, configure the wireless communication device according to the incoming message.

20. The wireless communication device according to claim 13, wherein:

when the wireless communication device is at the power-down standby mode, only the accessorial device is provided with power for controlling the power-on switch;

the accessorial device implements a one-trigger mechanism, such that by a single triggering signal from the accessorial device, the wireless communication device is brought back from the power-down standby mode without further input; and the accessorial device is only used for controlling the power-on switch to recover the wireless communication device from the power-down standby mode.

* * * * *